Jan. 10, 1933.  H. O. CLARK  1,894,160
BRAKE MECHANISM CONTROLLED BY STEERING MEANS
Filed Sept. 15, 1931   2 Sheets-Sheet 1
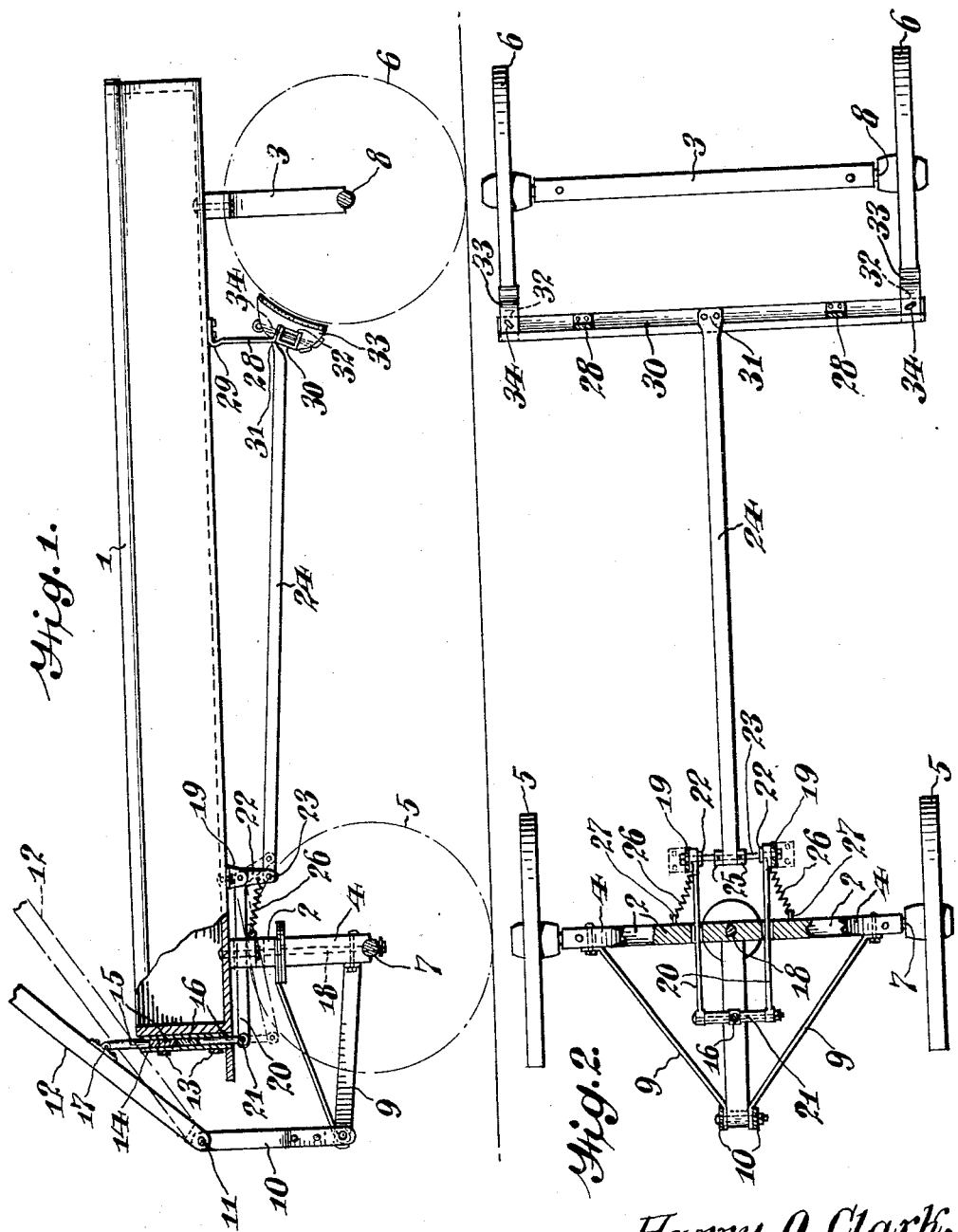
Harry O. Clark,
INVENTOR
BY Victor J. Evans
ATTORNEY Jan. 10, 1933.  H. O. CLARK  1,894,160
BRAKE MECHANISM CONTROLLED BY STEERING MEANS
Filed Sept. 15, 1931  2 Sheets-Sheet 2
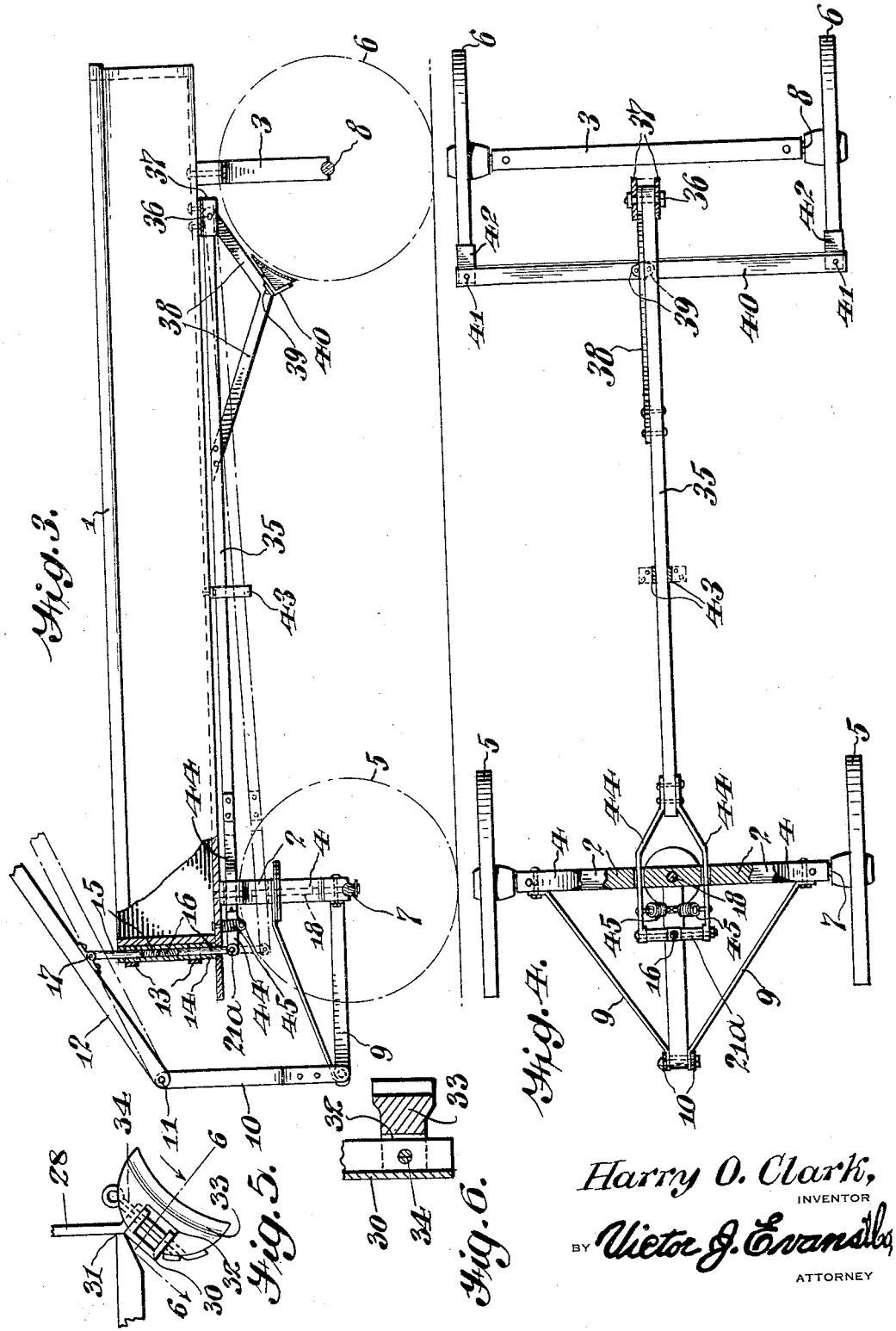
Harry O. Clark,
INVENTOR
BY Victor J. Evans & Co.
ATTORNEY Patented Jan. 10, 1933

1,894,160

UNITED STATES PATENT OFFICE

HARRY O. CLARK, OF PHILADELPHIA, PENNSYLVANIA

BRAKE MECHANISM CONTROLLED BY STEERING MEANS

Application filed September 15, 1931. Serial No. 562,946.

The present invention relates to an improved brake mechanism for toy wagons, and especially of a type where the brake beam and brake shoes are operated by a steering mechanism on the front of the wagon, still permitting the operator to have full and complete control of the steering means.

The invention has for its purpose to provide an improved brake mechanism, wherein the brake beam and the brake shoes are held under tension, in such a wise as to keep the brake shoes out of contact with the peripheries of the rear wheels during the ordinary rolling movements of the wagon, in conjunction with a device carried by a steering beam of a steering mechanism, adapted for operative association with an element of the brake mechanism, for operating the brake mechanism against the tensioning action to apply the brake shoes, the device being entirely independent of and freely unattached to the element, thereby preventing no interference with the operation of the steering mechanism.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a view in section and in elevation of a wagon showing the brake mechanism with the steering mechanism controlling the same applied thereto in accordance with the invention, also showing the brake mechanism operated in dotted lines.

Figure 2 is a plan view showing the wagon body removed.

Figure 3 is a view partly in elevation and partly in section of a wagon showing the modified form of brake mechanism applied in accordance with the invention.

Figure 4 is a plan view showing the body of the wagon removed.

Figure 5 is an enlarged detail view of the mounting of the brake shoes. Figure 6 is a sectional view on line 6—6 of Figure 5.

Referring to the drawings 1 identifies the body of a wagon provided with forward and rear bolsters 2 and 3, the forward bolster also including a sub-bolster 4, and 5 and 6 identify forward and rear wheels, which are mounted on axles 7 and 8, the former being associated with the sub-bolster while the latter is associated with the rear bolster.

A bracket 9 is carried by the sub-bolster, and a link 10 is pivoted to the forward smaller end of the bracket, and connected to the link at 11 is a steering beam 12.

Secured upon the front end of the wagon body 1 by metal straps 13 is a tubular guide 14 for the reception of the upper and lower plunger 15 and 16, the former being operatively connected at 17 to the steering beam 12. Obviously by moving the steering beam 12 to the right or left, it will transmit similar movements to the link 10 and the bracket 9, hence rocking the sub-bolster on the king pin 18.

Suitable hangers 19 are carried by and depend from the bottom of the body, and pivoted in the hangers is a double armed bell crank 20, the forward ends of the two arms thereof merge into a transverse part 21, which is connected to the lower end of the lower plunger 16.

The lower extremities of the short portions 22 of the two arms of the bell crank receive a transverse bolt 23, which passes through the forward end of the brake rod or reach 24. In this way the brake bar or reach 24 pivotally connects with the two armed bell crank. Two collars 25 on the bolt 23 retain the forward end of the brake bar or reach centered. Suitable springs 26 are also connected to the ends of the portions 22 of the two arms of the bell crank. The springs 26 are in turn connected at 27 to the rear face of the bolster 2, thereby holding the bell crank in its normal position with the plunger 16 raised in the tubular guide 14.

A pair of hangers 28 depend from the under surface of the wagon body near its rear portion. These hangers 28 are relatively flexible at 29, so that they can be moved rearwardly. Carried by the lower ends of the hangers 28 is a brake beam 30, which is preferably of channel iron construction, and to the center of which the rear end of the brake bar or reach 24 is fastened at 31. The opposite ends of the channel iron brake beam engage in recesses 32 of the brake shoes 33, there being cotter pins 34 passing through the brake shoes and through the ends of the brake beam, to fasten the brake shoes in position. It will be noted that the brake shoes 33 have very slight pivotal movements on the cotter pins 34, allowing the faces of the brake shoes to accommodate themselves to any possible irregularities of the peripheries of the rear wheels 6.

In the operation of this type of brake mechanism, it is possible to depress the steering beam 12, forcing the plunger 15 down into the tubular guide 14 engaging upon the end of the plunger 16 and depressing it, thereby tilting the bell crank against the action of the tensioning springs 26, moving the brake bar or reach 24 longitudinally, and hence likewise moving the brake beam and applying the brake shoes to the rear wheels. As soon as pressure is relieved on the steering beam, the tensioning springs 26 will move the bell crank to its normal position and raise the plunger 16 in the guide tube consequently disengaging the brake shoes from the rear wheel 6. As long as the steering beam is in a raised position, it can be moved to the right or the left, for the purpose of rocking the sub-bolster and hence steering the front wheels.

Referring to Figures 3 and 4, which show a modified construction of brake mechanism, the body of the wagon, the supporting wheels, bolsters, the steering mechanism, the tubular guide and the plungers operable therein are all similar in construction to those in Figures 1 and 2, and are identified by like reference characters.

In the construction in Figures 3 and 4 a longitudinal brake rod or reach 35 is fulcrumed at 36 to suitable depending hangers 37 carried by the bottom of the wagon body, and a substantially angular depending bar 38 is carried by the brake bar or reach. This depending member 38 is connected at 39 to a brake beam 40, which is angle iron in cross section, and secured at 41 in the ends of the angle iron brake beam are brake shoes 42, which are in position to engage with the rear supporting wheels 6.

The brake bar or reach 35 operates between the sides of a guide 43, which is carried by the under surface of the wagon body, at a point near the center thereof. The purpose for this guide, is to prevent any lateral movement of the brake bar or reach 35. The forward end of the brake bar has two forks 44, through the extremities of which a bolt 21a (which corresponds to the transverse part 21 of the bell crank 20) passes, and this bolt 21a is also engaged through the lower end of the plunger 16 in Figures 3 and 4. Suitable springs 45 are connected to the forks 44 and in turn to the bottom of the wagon body, thereby normally holding the brake bar or reach 35 in its normal position parallel with the under surface of the wagon body, and when so positioned the plunger 16 in Figures 3 and 4 is raised in the guide tube 14 of Figures 3 and 4.

The steering mechanism as in Figures 3 and 4 operates the same as in Figures 1 and 2. However when the steering beam 12 in Figures 3 and 4 is depressed, the upper plunger depresses the lower plunger, and thereby rocks the brake bar or reach 35 on its fulcrum, causing the brake beam to move in a direction toward the rear wheels, in which case the brake shoes will frictionally contact with the peripheries of the wheels. As soon as pressure is relieved on the steering beam and the beam raised to steer the front wheels, the springs 45 act to return the reach 35 to its normal position and thereby relieve engagement between the brake shoes and the wheels.

The invention having been set forth, what is claimed is:

1. In a brake mechanism, the combination with a wagon having a steering mechanism including a steering beam, said wagon having a body and provided with supporting front steering and rear wheels, of a brake beam having brake shoes for co-operation with the peripheries of the rear wheels, and a brake bar or reach having its rear end connected to the brake beam, a guide on the forward end of the wagon body, upper and lower plungers mounted in the guide, the former being operatively connected to the steering beam, and means operatively connecting the latter and the forward end of the brake bar or reach, whereby upon depressing the steering beam and moving the upper plunger in contact with the lower plunger the brake bar or reach operates to move the brake beam and apply the brake shoes.

2. In a brake mechanism for a toy wagon, a wagon body provided with forward steering and rear supporting wheels, a steering device for the forward wheels and including a steering beam, a guide on the forward end of the body, upper and lower plungers in the guide, the former being operatively connected to the steering beam, the latter being free and unattached but operative by the former, a brake beam having brake shoes co-operative with the rear wheels, a brake bar or reach operatively suspended under the body and having its forward end operatively connected to the lower plunger, and its rear end operatively connected to the brake beam, whereby upon depressing the steering beam, the brake beam may operate and apply the brake shoes.

3. In a brake mechanism for a toy wagon, a wagon body provided with forward steering and rear supporting wheels, a steering device for the forward wheels and including a steering beam, a guide on the forward end of the body, upper and lower plungers in the guide, the former being operatively connected to the steering beam, the latter being free and unattached but operative by the former, a brake beam having brake shoes co-operative with the rear wheels, a brake bar or reach with its rear end operatively pivoted to the under portion of the wagon body adjacent its rear end, means depending from the bar or reach and supporting the brake beam, the forward end of the brake bar or reach being spring tensioned to support the reach in a raised position and having its extremity pivoted direct to the lower plunger, whereby upon depressing the steering beam the reach may be tilted, the brake beam operated and the shoes applied to the rear wheels.

4. In a brake mechanism for a toy wagon, a wagon body provided with forward steering and rear supporting wheels, a steering device for the forward wheels and including a steering beam, a guide on the forward end of the body, upper and lower plungers in the guide, the former being operatively connected to the steering beam, the latter being free and unattached but operative by the former, a brake beam having brake shoes co-operative with the rear wheels, means for suspending the brake beam from the under part of the wagon body, a brake bar or reach having its rear end connected to the brake beam, a bell crank pivotally supported on the under face of the body one end of the bell crank being operatively connected to the forward end of the reach, the reach being spring tensioned to retain the shoes free from engagement with the rear wheels, the other end of the bell crank being operatively pivoted to the lower plunger, whereby upon depressing the steering beam the reach operates rearwardly, likewise moving the brake beam and applying the brake shoes.

5. In a brake mechanism, the combination with a wagon including a body and provided with supporting front steering and rear wheels, of a brake beam having brake shoes for cooperation with the peripheries of the rear wheels, a brake bar or reach having its rear end connected to the brake beam, a guide on the forward end of the wagon body, a steering beam operatively connected to the front steering wheels, a pair of rocking members mounted on a horizontal axis suspended from the bottom of the body and in turn connected to one end of the brake bar or reach, and abutting elements in the guide, one connected to the rocking members, the other connected to the steering beam, whereby upon depressing the steering beam keeping the elements abutted and imparting movement to the brake bar or reach, and hence imparting movement to the brake beam and applying the brake shoes.

6. In a brake mechanism, the combination with a wagon including a body and provided with supporting front steering and rear wheels, of a brake beam having brake shoes for cooperation with the peripheries of the rear wheels, a brake bar or reach, means for suspending the brake bar or reach and the brake beam from the bottom of the body, a guide on the forward end of the wagon body, a steering beam operatively connected to the front steering wheels, a pair of abutting elements mounted in said guide, one being connected to the steering beam, and means connected to the other of said abutting elements and in turn connected to the brake bar or reach, whereby upon depressing the steering beam and keeping the elements abutted, movement is transmitted to the brake bar or reach and the brake beam hence applying the brake shoes.

In testimony whereof I affix my signature.
HARRY O. CLARK.